United States Patent [19]

Sannes

[11] 4,139,687

[45] Feb. 13, 1979

[54] CYCLIC CARBONATE TRIMER OF 2,2-BIS(4-HYDROXYPHENYL)-1,1-DICHLOROETHYLENE

[75] Inventor: Keith N. Sannes, Mt. Vernon, Ind.

[73] Assignee: General Electric Company, Schenectady, N.Y.

[21] Appl. No.: 804,940

[22] Filed: Jun. 9, 1977

[51] Int. Cl.$^2$ .................... C08L 25/06; C08L 67/00; C08L 69/00
[52] U.S. Cl. .................................. 526/1; 260/45.8 A; 260/340.2; 260/DIG. 24; 528/196; 528/199
[58] Field of Search ....... 260/47 XA, 340.2, 45.7 RT, 260/DIG. 24, 77.5 D, 75 H, 873, 875; 526/346, 1, 45.95 B, 45.8 A

[56] References Cited

U.S. PATENT DOCUMENTS

| | | | |
|---|---|---|---|
| 3,274,214 | 9/1966 | Prochaska | 260/340.2 |
| 3,991,120 | 11/1976 | Ladd | 260/613 R |

*Primary Examiner*—Theodore E. Pertilla
*Attorney, Agent, or Firm*—William A. Teoli; Joseph T. Cohen; Charles T. Watts

[57] ABSTRACT

The cyclic carbonate trimer of 2,2-bis(4-hydroxyphenyl)-1,1-dichloroethylene is provided which can be employed as a flame retardant for a variety of thermoplastic organic polymers, such as high molecular weight bisphenol-A polycarbonate. This cyclic carbonate trimer also can be employed as a precursor for making high molecular weight phenyl dichloroethylene polycarbonate.

2 Claims, No Drawings

CYCLIC CARBONATE TRIMER OF 2,2-BIS(4-HYDROXYPHENYL)-1,1-DICHLOROETHYLENE

The present invention relates to the cyclic carbonate trimer of dichloroethylene bisphenol and the conversion of such material to high molecular weight polycarbonate.

The cyclic carbonate trimer of the present invention has the formula,

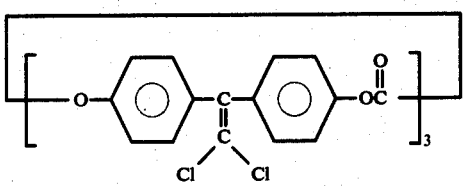

(1)

As shown in copending application RD-9052 of John E. Hallgren, filed concurrently herewith and assigned to the same assignee as the present invention, the cyclic carbonate trimer or "trimer" of formula (1) can be made by agitating a mixture of polycarbonate, consisting essentially of chemically combined units of the formula,

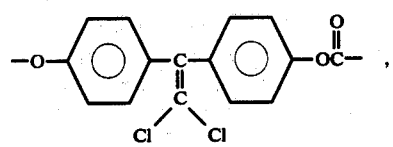

(2)

an organic solvent and an effective amount of a tertiary organic amine, followed by recovering the desired trimer by filtering the mixture in accordance with standard techniques.

Polycarbonates consisting essentially of units of formula (2) can be made by the phosgenation of bisphenols of the formula,

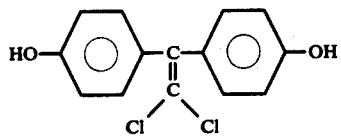

(3)

A synthesis of polycarbonate is shown by Z. Wielgosz and S. Porejko, "Synthesis and Properties of Polycarbonates from Chlorobisphenols", Polimery-Tworzywa Wielkocazsteczkowe, 1971, pages 495–500. As taught by Hallgren in RD-9052, trimer of formula (1) also can be made in quantitative yields by initially phosgenating phenols of formula (3) in the presence of an aqueous alkali hydroxide and a tertiary amine catalyst to produce linear polycarbonate, effecting the removal of the aqueous phase from the resulting reaction mixture, agitating the organic phase in the presence of a tertiary organic amine catalyst and filtering the mixture to recover solids.

Included by the tertiary organic amines which can be employed to make the trimer of formula (1) or convert the trimer to polycarbonate consisting essentially of units of formula (2) are, for example, triethylamine, N-methyl piperidine lutedine, diisopropylethylamine, pyridine, tributylamine, etc. Included by the organic solvents which can be used in the practice of the present invention are, for example, methylene chloride, chloroform, tetrahydrofuran, chlorobenzene, dioxane, dichlorobenzene, trichloroethylene, etc. Some of the alkali metal hydroxides which can be used to make polycarbonate are, for example, sodium hydroxide, potassium hydroxide, calcium hydroxide, etc.

In making the trimer of formula (1), bisphenol of formula (3) can be converted to polycarbonate by either an interfacial phosgenation or phosgenating an organic solvent solution of the bisphenol in the presence of tertiary organic amine catalyst. Agitation can be conducted under ambient conditions, or at temperatures up to reflux, depending upon the rate desired. The mixture can then be filtered or allowed to settle and the organic phase recovered. The organic phase is then agitated under ambient conditions in the presence of an effective amount of tertiary organic amine, such as 0.1% to 10% by weight, based on the weight of the mixture. After the mixture has been agitated for at least 4 hours, it can be filtered in accordance with standard techniques to effect recovery of trimer.

Under interfacial conditions, phosgenation of the mixture of the bisphenol of formula (3) can be performed at a temperature in the range of from 25° C. to 75° C. There can be employed from 20% to 50% by weight of alkali hydroxide, or 0.5% to 5% of tertiary organic amine, based on the weight of the mixture.

The cyclic trimer of the present invention can be employed as an intermediate for making polycarbonate substantially free of impurities normally associated with such polycarbonate made by direct phosgenation of a bisphenol of formula (3). In addition, the cyclic carbonates can be employed as a flame retardant when used with engineering thermoplastics, such as high performance Lexan polycarbonate, Valox polyester, Noryl resin, polyethylene-polypropylene copolymer, high impact polystyrene, etc., which are manufactured by the General Electric Co. There can be used from 5% to 50% by weight of trimer, based on the total weight of the cyclic carbonate polycarbonate blend.

In order that those skilled in the art will be better able to practice the present invention, the following examples are given by way of illustration and not by way of limitation. All parts are by weight.

EXAMPLE 1.

A mixture of 1.0 part 1,1-bis(4-hydroxyphenyl)-2,2-dichloroethylene, 0.05 parts triethylamine, 12 parts of methylene chloride and 1 part of sodium hydroxide pellets was phosgenated over a period of 20 minutes while the mixture was stirred at a temperature of 25° C.–35° C. The phosgene addition was terminated and the mixture was stirred for an additional 5 minutes. The mixture was then acidified, washed twice with water, then poured into 40 parts of methanol to produce 1.1 part of polycarbonate which represented a yield of 92%.

A mixture of 0.5 part of the above polycarbonate, 13 parts of methylene chloride and 0.1 part of triethylamine was stirred for 66 hours under nitrogen and under ambient conditions. A white precipitate formed and the mixture was filtered under vacuum. The precipitate was washed with methylene chloride and ether and dried under reduced pressure at 100° C. to provide 0.48 part of product, representing a yield of 97%. Based on its IR spectrum and further confirmed by NMR, GPC and MS, the product was the cyclic trimer of formula (1).

EXAMPLE 2.

A solution of 28.1 parts of the bisphenol of formula (3), about 2600 parts of dry methylene chloride and 30.5 parts of triethyl amine is stirred and phosgenated. The conditions of phosgenation are as described in Example 1. A hazy mixture is formed which is filtered. There is recovered about a 6% yield or 1.72 parts of the trimer of formula (1).

A solution blend of 0.5 part of the above trimer and 5 parts of Lexan polycarbonate is prepared in methylene chloride. After the solvent is stripped off, the blend is evaluated for flame retardance. The blend is found to have a superior flame retardance as measured by the UL Bulletin 14 test procedure as compared to Lexan polycarbonate free of trimer. Effective flame retardance is found over a range of from 4% to 18% trimer based on the weight of blend.

EXAMPLE 3.

A mixture of 100 parts of trimer, 2 parts of phenol, 10 parts of triethylamine and 2000 parts of chlorobenzene was refluxed for 7 hours. A product precipitated when the reaction mixture was poured into methanol. There was obtained a quantitative yield of polymer consisting essentially of chemically combined units of formula (2) based on its IR spectrum. High molecular weight GPC showed $M_w$ and $M_n$ values of 3359 and 2082 g/mol, respectively.

In addition to copending application RD-9052 of John E. Hallgren, there is also being filed concurrently herewith RD-9987 of John E. Hallgren directed to higher cyclopolycarbonates. In addition, polycarbonates, consisting essentially of chemically combined units of formula (2) can be made as shown by Example 3 by utilizing from about 1 to 10 mol percent of phenol based on the total moles of phenol and carbonate units in the mixture of from 0.1% to 10% of tertiary organic amine. In addition, there also can be used a $C_{(6-20)}$ monohydric phenol as an initiator for the preparation of polycarbonate consisting essentially of units of formula (2).

Although the above examples are directed to only a few of the very many variables to which the cyclic trimer of the present invention can be prepared, it should be understood that a much broader variety of conditions and ingredients can be used which are shown in the description preceding these examples.

What I claim as new and desire to secure by Letters Patent of the United States is:

1. A cyclic trimer having the formula

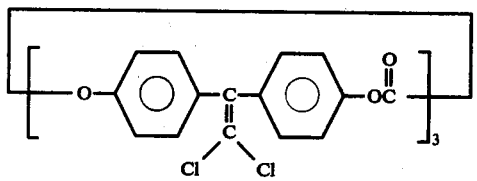

2. A composition comprising an organic polymer selected from the class consisting of polycarbonate, polyester and polystyrene, having from 5 to 50% by weight of the cyclic trimer of claim 1.

* * * * *